Feb. 29, 1944. W. H. FRANK ET AL 2,343,178
CIRCUIT MASTER COLUMN TYPE PANELBOARD
Filed Dec. 16, 1940 3 Sheets-Sheet 1

INVENTORS
William H. Frank
BY William Robertson
Daniel G. Cullen

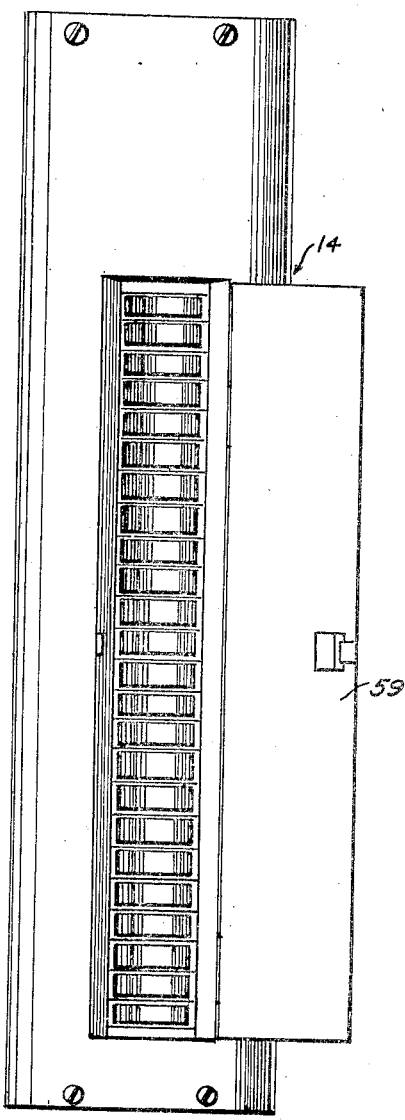
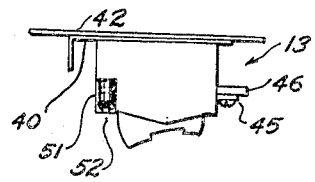
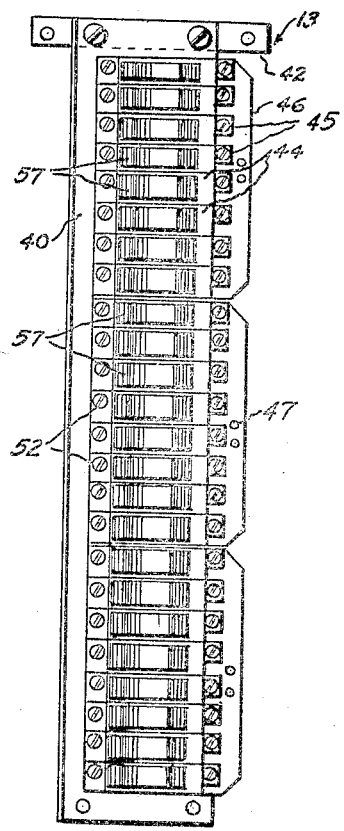

Feb. 29, 1944.   W. H. FRANK ET AL   2,343,178
CIRCUIT MASTER COLUMN TYPE PANELBOARD
Filed Dec. 16, 1940   3 Sheets-Sheet 3

INVENTORS
William H. Frank
William Robertson
BY
Daniel G. Cullen

Patented Feb. 29, 1944

2,343,178

UNITED STATES PATENT OFFICE 2,343,178

CIRCUIT MASTER COLUMN TYPE PANEL BOARD

William H. Frank and William Robertson, Detroit, Mich., assignors to Bulldog Electric Products Company, Detroit, Mich., a corporation of West Virginia Application December 16, 1940, Serial No. 370,253

3 Claims. (Cl. 175—308)

This application relates to panelboards and particularly to panelboards which are narrow enough to be disposed between the flanges of a conventional H or I beam or column.

Such a panelboard, though compactly designed so as to fit into the intended space, must be made in such a way as to permit easy wiring. In the embodiment shown herein, this objective is attained by forming the box or casing of the panelboard of two halves or channels separated vertically or longitudinally on a plane well back of the front of the panel, so that the back channel may be inserted into the column before any wiring is done and before the panel is inserted into the casing.

Then the main wires and branch wires are run into the back channel and properly anchored or positioned, and their terminals stripped. The terminals of the main wires are connected to wire connectors permanently mounted in the back channel and having forwardly extending straps or lugs. The branch wires are temporarily anchored and positioned in the back channel by having their ends thrust through holes in a circuit numbered strip and twisted over temporarily. Thereafter a panel of branch circuit control units, such as circuit breakers or the like, is mounted in the back channel. Bus bars of the panel align with the straps or lugs of the wire connectors for the main wires, so as to be connectable to such straps or lugs.

The units have wire connectors into which the stripped and already positioned branch wires may be thrust and connected to complete the electrical connecting and wiring. The steps of mounting the panel in the back channel and of connecting the branch wires to the connectors of the units, and connecting the panel bus bars to the straps of the main wire connectors may be performed long after the back channel is mounted and the rough wiring done. After the panel is mounted in the back channel and after the wiring is completed, the front channel, including trim flanges and a swinging cover, is then mounted on the back channel, being secured thereto by means of front manipulable screws.

The division or splitting of the casing longitudinally and vertically on a plane well back of the front of the panel faciltitates rough wiring, inasmuch as it makes the back channel in which such wiring is done, extremely shallow.

The main wires are connected long before the panel is inserted into the panelboard and the branch wires are run in and located and temporarily anchored long before the panel is inserted, and the rough wiring, done before the panel is inserted, is made easy because of the absence of the panel during rough wiring.

The panel is mounted in the back channel while free of any connection to wires and thus the mounting of the panel is made easy because there are no wires attached to it at that time to interfere with panel mounting.

Finish wiring is also easy, involving only the connection of the panel bus bars to the main wire connector lugs or straps, and the insertion of the branch wire terminals in the end opening branch wire connectors of the panel, with all binding screws being front manipulable, and all finish wiring being done with the front channel not in place.

For an understanding of the panelboard herein disclosed, reference should be made to the accompanying drawings disclosing an embodiment.

In these drawings,

Fig. 3 is a front view of the panelboard;

Fig. 4 is a front view of the panel sub assembly unit;

Figs. 5–8 are end views of Figs. 4, 1, 2, and 3 respectively.

Figure 1:
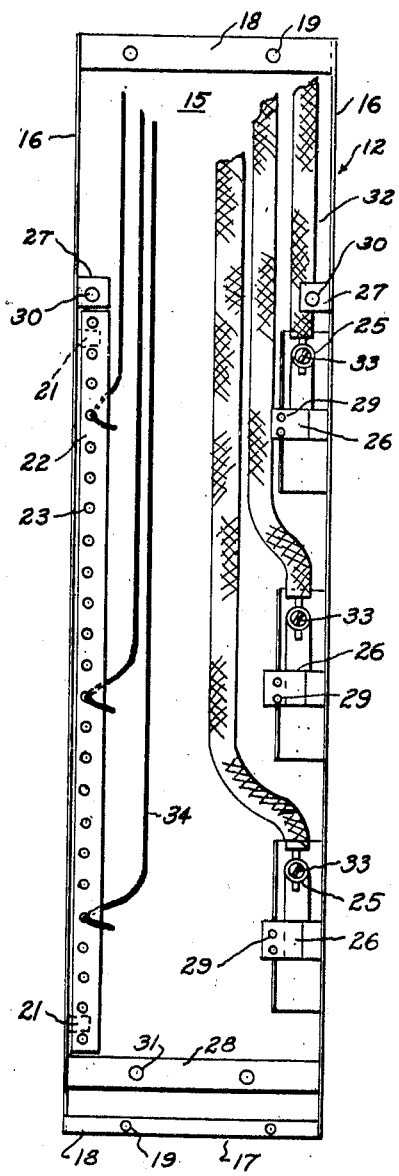
Fig. 1 is a front view of the back channel only, with rough wiring in place.
Figure 2:
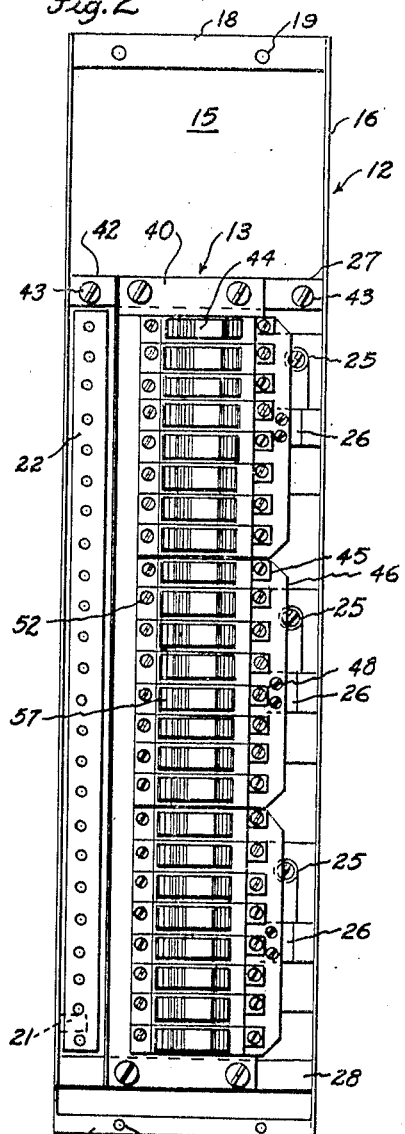
Fig. 2 is a front view of the back channel with the panel in place.
Figure 6:
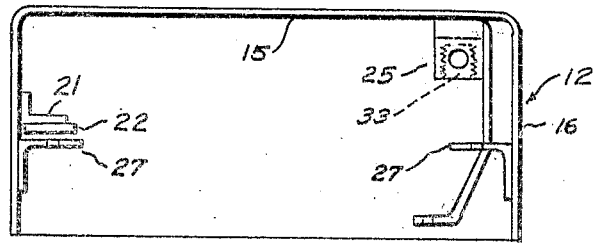
Figure 7:
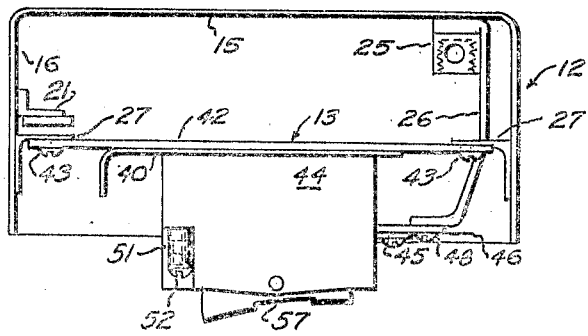
Figure 8:
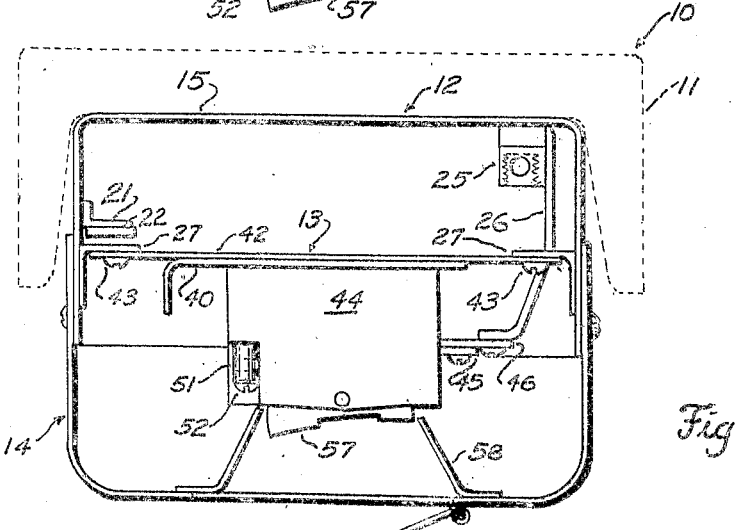

Referring to these drawings, it will be seen that they show a column 10 disposed vertically and between the flanges 11 of which is to be disposed the panelboard of the invention.

The panelboard itself includes a back channel 12, a panel 13, and a front channel 14, and these will be separately described.

The back channel 12 comprises a sheet metal round corner channel whose web 15 is secured to the web of the column and whose flanges 16 are within but adjacent the flanges of the column. The upper end of the channel is open; the lower end is closed by a horizontal closure plate 17 secured permanently to the back channel. The upper and lower ends of the channel 12 are provided with rings 18 having tapped holes 19, for purposes later to be described.

On the left side flange 16 of the back channel 12 are angle brackets 21 which support a branch circuit numbered strip 22 having numerous holes 23 for receiving branch circuit wires, the holes corresponding in position and number to the units of the panel.

Near the right flange 16, but on the web of the back channel 12 are permanently mounted U shaped insulation shields within which are wire connectors 25 opening to the top of the casing for receiving the ends of main wires. These connectors are formed with forwardly projecting lugs or straps 26.

Above the top end of the branch circuit numbering strip are angle supports 27 for the panel. Below the lower end of the branch circuit numbered strip and connecting the sides of the back channel is a shelf 28. Parts 26, 27 and 28 have tapped holes 29, 30 and 31 respectively.

The back channel with its main wire connectors 25, its numbered strip 22, its panel supporting shelf 28 and its panel supporting angle brackets 27 and the top and bottom rings 18 is disposed in a column. Then the main wires 32 are run into the back channel through its open top. The main wires are run down along the back of the channel and are cut to length and the ends thereof are then stripped and run into the U shaped insulation barriers 24 and the connectors 25. Screws 33 of the conectors are front manipulable to secure the main wire terminals in the connectors 25. The branch wires 34 are also run into the space through its open top, and down behind the branch circuit numbered strip 22 and then selected ends of branch wires, trimmed to length, are thrust through proper ones of the numbered branch circuit holes 23 of the numbered strip 22 and twisted over slightly so as to be anchored there temporarily.

The parts in the condition now described may be left untouched for any desired length of time, as is desirable in the case of rough wiring. When a panel is to be inserted and the wiring is to be finished, a panel which will now be described may be utilized.

The panel 13 itself includes a mounting plate 40 at whose lower end are holes through which may be passed screws threading into the tapped holes 31 of the panel mounting shelf 28 anchored to the back half of the channel. At the upper end of the mounting plate is a cross strap 42 whose ends have holes through which may be passed screws 43 threading into the tapped holes 30 of the angles or brackets 27 on the sides of the back channel for securing the top of the mounting plate to the channel. The shelf 28 at the lower end of the channel supports the weight of the mounting panel and the units 44 thereon.

The units themselves are permanently mounted on the mounting plate, by means of front manipulable screws. Main feed lugs 45 project sidewise from the ends of the units and are permanently connected, when the panel is being formed, to bus bars 46 having clear holes 47 adapted to aline with the tapped holes 29 of the straps or lugs 26 which are permanently fastened to the main wire connectors 25 and which project forwardly, these straps, with the main wire connectors, being in the back channel long before the panel is mounted. When the panel is mounted the bus bar holes 47 align with the tapped holes 29 of these straps and front manipulable screws 48 threaded into these tapped holes of the straps establish the mechanical and electrical connection between the bus bars and the straps and this supplies the main side of the panel units.

The branch side of the panel, i. e., the ends of these units, are equipped with end opening branch wire connectors 51 into which the ends of the branch wires, already thrust through the holes of the circuit numbered strip, may be inserted so that the branch wire ends may be electrically and mechanically connected to the wire connectors in the branch ends of the units by the front manipulable screws 52.

In all cases the manipulated screws are manipulated from the front. The main wire connectors have front manipulable screws; the screws which connect the panel bus bars to the main feed straps have their heads exposed to the front; the screws which mount the panel have their heads exposed to the front; and the conductors for the branch wires have screws whose heads are exposed to the front.

With manipulation of all of the screws just described, the finished wiring is completed and the front channel is ready to be applied to the back channel to complete the installation.

The front channel 14 consists of a rounded corner sheet metal channel whose web has a long aperture to expose the handles 57 of the branch circuit control units 44 and this aperture is surrounded by bevelled trim flanges 58 whose rear edges form an enclosure around the panel, exposing only the handles or such parts of the panel as are intended to be exposed. The aperture is closed by a swinging door 59 mounted on vertical axis hinges. The upper and lower ends of the web of the front channel are formed with clear holes through which may be passed front manipulable screws threaded into the tapped holes 19 of the rings 18 at the top and bottom of the back channel, to complete the assembly of the panelboard as a whole. The side flanges of the front channel telescope over the side flanges 16 of the back channel to form a tight casing.

For replacement of a unit 44 the disclosed construction is very satisfactory. All that is necessary for replacing a unit, is to remove the front channel, disconnect the unit by pulling out the screw which connects the main lug of the unit to the bus bar to which several units are ganged, the bus bar not being disturbed, then disconnecting the unit from its branch wire by pulling out the screw of its branch wire connector and then pulling the unit off its mounting plate by pulling out the front manipulable screw which fastens the unit to its mounting plate.

We claim:

1. In a panelboard, a casing having an open front, a panel therein so disposed as to leave a substantial enough space between its back and the back of the casing to form a wiring gutter directly in back of the panel, the casing having at opposite side edges of the panel front manipulable means for determining the length of the panel wires in the gutter and the location of their terminals and for anchoring such terminals in their final locations before a panel is inserted into the casing, and front manipulable means for mounting a panel in the casing after the wires are laid in the gutter and cut to length and their ends anchored in their desired locations, the panel having branch wire connectors on a side edge, one of the means for determining wire length and wire terminal location and for anchoring wire terminals in place comprising a distributor block having numerous holes for receiving terminals, with the location of the holes corresponding to the location of branch wire connectors on a side edge of the panel.

2. In a panelboard, a casing having an open front, a panel therein so disposed as to leave a substantial enough space between its back and the back of the casing to form a wiring gutter directly in back of the panel, the casing having at opposite side edges of the panel front manipulable means for determining the length of the panel wires in the gutter and the location of their terminals and for anchoring such terminals in their final locations before a panel is inserted into the casing, and front manipulable means for mounting a panel in the casing after the wires are laid in the gutter and cut to length and their ends anchored in their desired locations, the panel having bus bars on a side edge thereof, one of the means for determining wire length and wire terminal location and for anchoring wire terminals in place comprising wire connectors having forwardly extending straps positioned to be engaged by and make contact with the panel bus bars, and front manipulable means for connecting the bus bars to such straps.

3. In a panelboard, a casing having an open front, a panel therein so disposed as to leave a substantial enough space between its back and the back of the casing to form a wiring gutter directly in back of the panel, the casing having at opposite side edges of the panel front manipulable means for determining the length of the panel wires in the gutter and the location of their terminals and for anchoring such terminals in their final locations before a panel is inserted into the casing, and front manipulable means for mounting a panel in the casing after the wires are laid in the gutter and cut to length and their ends anchored in their desired locations, the panel having branch wire connectors on a side edge, one of the means for determining wire length and wire terminal location and for anchoring wire terminals in place comprising a distributor block having numerous holes for receiving terminals, with the location of the holes corresponding to the location of branch wire connectors on a side edge of the panel, the panel having bus bars on a side edge thereof, one of the means for determining wire length and wire terminal location and for anchoring wire terminals in place comprising wire connectors having forwardly extending straps positioned to be engaged by and make contact with the panel bus bars, and front manipulable means for connecting the bus bars to such straps.

WILLIAM H. FRANK.
WILLIAM ROBERTSON.